(12) United States Patent
Nate et al.

(10) Patent No.: US 11,764,685 B2
(45) Date of Patent: Sep. 19, 2023

(54) POWER SUPPLY CONTROL DEVICE AND INSULATED SWITCHING POWER SUPPLY

(71) Applicant: Rohm Co., Ltd., Kyoto (JP)

(72) Inventors: Satoru Nate, Kyoto (JP); Yohei Akamatsu, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 106 days.

(21) Appl. No.: 17/494,961

(22) Filed: Oct. 6, 2021

(65) Prior Publication Data
US 2022/0123658 A1 Apr. 21, 2022

(30) Foreign Application Priority Data
Oct. 15, 2020 (JP) .................. 2020-174024

(51) Int. Cl.
*H02M 3/335* (2006.01)
*H02M 1/00* (2006.01)

(52) U.S. Cl.
CPC ...... *H02M 3/33523* (2013.01); *H02M 1/0025* (2021.05); *H02M 1/0038* (2021.05)

(58) Field of Classification Search
CPC .......... H02M 1/0025; H02M 1/00387; H02M 3/335–33592
See application file for complete search history.

(56) References Cited

U.S. PATENT DOCUMENTS

| | | | | |
|---|---|---|---|---|
| 7,463,497 B2* | 12/2008 | Negrete | ............ | H02M 3/33507 363/21.13 |
| 2007/0109821 A1* | 5/2007 | Yang | .................. | H02M 3/33523 363/21.04 |
| 2009/0021968 A1* | 1/2009 | Komatsu | ........... | H02M 3/33507 363/126 |
| 2014/0268923 A1* | 9/2014 | Valley | ............... | H02M 3/33523 363/21.17 |
| 2014/0312684 A1* | 10/2014 | Sawada | ............. | H02M 3/33523 363/21.17 |
| 2016/0373011 A1* | 12/2016 | Kawashima | ............ | H02M 1/32 |
| 2018/0083543 A1* | 3/2018 | Hara | .................... | H02M 3/1563 |
| 2019/0334428 A1* | 10/2019 | Arima | ...................... | H02M 1/08 |
| 2020/0112256 A1* | 4/2020 | Matsuda | ............... | H02M 7/217 |
| 2021/0211048 A1* | 7/2021 | Yu | ....................... | H02M 1/0029 |

FOREIGN PATENT DOCUMENTS

JP   2009-095224   4/2009

* cited by examiner

*Primary Examiner* — Fred E Finch, III
(74) *Attorney, Agent, or Firm* — Fish & Richardson P.C.

(57) ABSTRACT

The present disclosure provides a power supply control device. The power supply control device includes a feedback voltage generator, an on-timing setting unit and an off-timing setting unit. The feedback voltage generator is configured to generate a feedback voltage by sampling a primary voltage of a transformer that forms an insulated switching power supply. The on-timing setting unit is configured to turn on a primary current of the transformer based on a comparison result between the feedback voltage and a slope-shaped reference voltage. The off-timing setting unit is configured to turn off the primary current after a predetermined on time has elapsed since the primary current was turned on. A sampling timing of the primary voltage is set based on an on timing of the primary current.

16 Claims, 14 Drawing Sheets

POWER SUPPLY CONTROL DEVICE AND INSULATED SWITCHING POWER SUPPLY

BACKGROUND

Technical Field

The disclosure disclosed by the present application relates to a power control device and an insulated switching power supply using the power control device.

Description of the Prior Art

Conventionally, insulated switch power supplies (for example, flyback power supplies) are mounted in various applications such as vehicles.

Moreover, an example of the prior art related to the contents may be referred from patent publication 1.

PRIOR ART DOCUMENT

Patent Publication

[Patent document 1] Japan Patent Publication No. 2009-95224

SUMMARY

Problems to be Solved by the Disclosure

However, the load regulation rate (=the output stability with respect to a change in the load) of conventional insulated switch power supplies needs to be further improved.

In view of the issues discovered by the applicant, it is an object of the present application to disclose a power control device with an outstanding load regulation rate and an insulated switching power supply using the power control device.

Technical Means for Solving the Problem

A power control device disclosed by the present application is configured as below (first configuration), that is, including: a feedback voltage generator, configured to generate a feedback voltage by sampling a primary voltage of a transformer that forms an insulated switching power supply; an on-timing setting unit, configured to turn on a primary current of the transformer according to a comparison result between the feedback voltage and a slope-shaped reference voltage; and an off-timing setting unit, configured to turn off the primary current after a predetermined on time has elapsed since the primary current was turned on, wherein a sampling timing of the primary voltage is set according to an on timing of the primary current.

Moreover, the power control device including the first configuration may also be configured as below (second configuration), that is, the on-timing setting unit includes a first reference voltage and a second reference voltage as the reference voltage, the second reference voltage being adjusted to have a slope shape synchronized with the first reference voltage and to intersect the feedback voltage at a timing earlier than the first reference voltage, and wherein the on timing of the primary current is determined by an intersection timing of the feedback voltage and the first reference voltage, and the sampling timing of the primary voltage is determined by an intersection timing of the feedback voltage and the second reference voltage.

The power control device including the second configuration may also be configured as below (third configuration), that is, the on timing setting unit includes: a first amplifier and a second amplifier, configured to blunt a pulse signal for turning on/off the primary current to respectively generate the first reference voltage and the second reference voltage; a first comparator, configured to compare the feedback voltage with the first reference voltage to generate a first set signal for setting the on timing of the primary current; and a second comparator, configured to compare the feedback voltage with the second reference voltage to generate a second set signal for setting the sampling timing of the primary voltage.

The power control device including the first configuration may also be configured as below (fourth configuration), that is, the on-timing setting unit is configured to generate a first feedback voltage and a second feedback voltage in response to receiving an input of the feedback voltage, the second feedback voltage being adjusted to intersect the reference voltage at a timing earlier than the first feedback voltage, and wherein the on timing of the primary current is determined by an intersection timing of the first feedback voltage and the reference voltage, and the sampling timing of the primary voltage is determined by an intersection timing of the second feedback voltage and the reference voltage.

The power control device including the fourth configuration may also be configured as below (fifth configuration), that is, the on-timing setting unit includes: a buffer, configured to generate the first feedback voltage from the feedback voltage; a voltage divider, configured to divide the first feedback voltage to generate the second feedback voltage; an amplifier, configured to generate the reference voltage by blunting the pulse signal for turning on/off the primary current; a first comparator, configured to compare the first feedback voltage with the reference voltage to generate a first set signal for setting the on timing of the primary current; and a second comparator, configured to compare the second feedback voltage with the reference voltage to generate a second set signal for setting the sampling timing of the primary voltage.

The power control device including any one of the first configuration to the fifth configuration may also be configured as below (sixth configuration), that is, the on-timing setting unit includes a correction circuit that corrects the on timing of the primary current such that a switching frequency of the insulated switching power supply is kept constant.

The power control device including any one of the first configuration to the sixth configuration may also be configured as below (seventh configuration), that is, the feedback voltage generator waits for sampling of the primary voltage until at least a predetermined mask time has elapsed after the primary current is turned off.

The power control device including any one of the first configuration to the seventh configuration may also be configured as below (eighth configuration), that is, the primary voltage is a switch voltage that appears in a primary winding of the transformer.

Moreover, for example, an insulated switching power supply disclosed by the present application is configured as below (ninth configuration), that is, including: the power supply control device of any one of the first configuration to the eighth configuration; a transformer, configured to apply a DC input voltage to a primary winding; and a rectifying and smoothing circuit, configured to generate a DC output voltage by rectifying and smoothing an induced voltage generated in a secondary winding of the transformer.

Moreover, a vehicle disclosed by the present application is configured as below (tenth configuration), that is, including the insulated switching power supply of the ninth configuration.

Effects of the Present Disclosure

According to the disclosure of the present application, a power control device with an outstanding load regulation rate and an insulated switching power supply using the power control device are provided.

DETAILED DESCRIPTION OF THE EMBODIMENTS

First Embodiment (Comparison Example)

Figure 1:
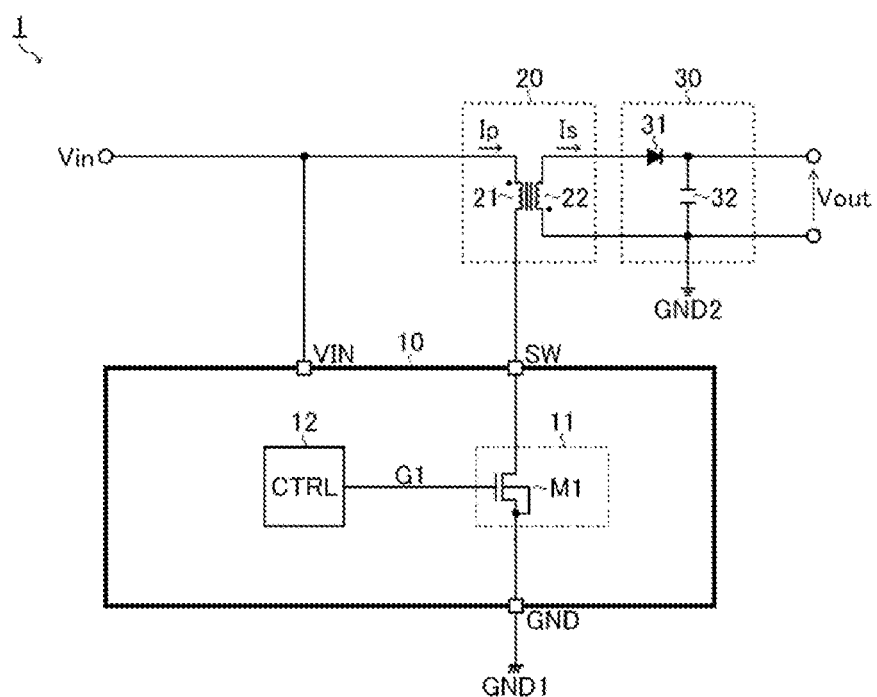
FIG. 1 is a diagram of an insulated switching power supply according to a first embodiment (comparison example)

FIG. 1 shows a diagram of an insulated switching power supply according to a first embodiment (equivalent to comparison example to be compared with a second embodiment and a third embodiment below). An insulated switching power supply 1 of this embodiment is for example, a flyback power supply as below: a primary circuit system (GND1 system) and a secondary circuit system (GND2 system) are electrically insulated in between, and a direct-current (DC) input voltage Vin supplied to the primary circuit system is converted to a required DC output voltage Vout and supplied to the secondary circuit system. The insulated switching power supply 1 includes a semiconductor device 10, a transformer 20, and a rectifying and smoothing circuit 30.

Moreover, when an alternating-current (AC) input voltage Vac is supplied to the insulated switching power supply 1, a rectifying circuit (e.g., a diode bridge) may also be provided in a front-stage, wherein the rectifying circuit (e.g., a diode bridge) converts the AC input voltage Vac into the DC input voltage Vin.

The semiconductor device 10 is a so-called power integrated circuit (IC) provided in the primary circuit system as a control entity of the insulated switching power supply 1. In addition, the semiconductor device 10 is a mechanism that includes a power terminal VIN, a switch terminal SW and a ground terminal GND, and establishes an electrical connection with the outside of the device. The power terminal VIN is connected to an application terminal of the DC input voltage Vin. The switch terminal SW is connected to the transformer 20 (particularly a primary winding 21 described below). The ground terminal GND is connected to a ground terminal GND1 of the primary circuit system. According to requirements, an external terminal apart from the mechanism may also be appropriately provided in the semiconductor device 10. The internal configuration of the semiconductor device 10 is described below.

The transformer 20 includes the primary winding 21 (with an Np number of turns) and a secondary winding 22 (with an Ns number of turns), wherein the primary winding 21 (with an Np number of turns) and the secondary winding 22 electrically insulate and magnetically couple the primary circuit system and the secondary circuit system. A first terminal (turns starting terminal) of the primary winding 21 is connected to an application terminal of the DC input voltage Vin. A second terminal (turns ending terminal) of the primary winding 21 is connected to the switch terminal SW of the semiconductor device 10. As such, the primary winding 21 is connected in series between the application terminal of the DC input voltage Vin and the switch terminal SW of the semiconductor device 10. On the other hand, the first terminal (turns ending terminal) of the secondary winding 22 is connected to an input terminal (the anode of a diode 31 to be described below) of the rectifying and smoothing circuit 30. The second terminal (turns starting terminal) of the secondary winding 22 is connected to a ground terminal GND2 of the secondary circuit system.

Moreover, the numbers of turns Np and Ns of the transformer 20 may be adjusted as desired in aim of obtaining the required DC output voltage Vout (=Vin×(Ns/Np)×(Ton/Toff), wherein Ton and Toff are an on time and an off time of the output switch 11 below). For example, as the number of turns Np increases or the number of turns of Ns decreases, the DC output voltage gets lower; conversely, as the number of turns Np decreases or the number of turns Ns increases, the DC output voltage Vout gets higher.

The rectifying and smoothing circuit 30 includes the diode 31 and a capacitor 32 provided in the secondary circuit system. The rectifying and smoothing circuit 30 generates the DC output voltage Vout by rectifying and smoothing an induced voltage generated in the secondary winding 22 of the transformer 20. The anode of the diode 31 is connected to a first terminal (turns ending terminal) of the secondary winding 22. The cathode of the diode 31 and a first terminal of the capacitor 32 are connected to the output terminal of the DC output voltage Vout. A second terminal of the capacitor 32 is connected to the ground terminal GND2 of the secondary circuit system.

<Semiconductor Device (Fundamental Structure)>

Next, the internal configuration (fundamental structure) of the semiconductor device 10 is described with reference to FIG. 1 below. The semiconductor device 10 of this configuration example includes an output switch 11 and a controller 12. According to requirements, constituting elements (such as various protection circuits) other than the constituting elements above may also be appropriately integrated in the semiconductor device 10.

The output switch 11 is a switch element, and turns on/off a current path from the application terminal of the DC input voltage Vin to the ground terminal GND1 of the primary circuit system through the primary winding 21 of the transformer 20 according to the gate signal G1, so as to turn on/off a primary current Ip flowing to the primary winding 21. When the output switch 11 is implemented by an N-channel metal-oxide semiconductor field-effect transistor (MOSFET) M1, the drain of the transistor M1 is connected to the switch terminal SW, and the source of the transistor M1 is connected to the ground terminal GND. In this case, the output switch 11 is turned on when a gate signal G1 is at a high level, and is turned off when the gate signal G1 is at a low level.

The controller 12 receives an input of an output feedback signal (not shown), and duty control of the gate signal G1 is performed such that the DC output voltage Vout becomes the desired target value. Moreover, the controller 12 also functions as a driver for generating the gate signal G1.

<Fundamental Actions>

Fundamental actions of the insulated switching power supply 1 are described in brief below. During the on time Ton of the output switch 11, the primary current Ip flows from the application terminal of the DC input voltage Vin to the ground terminal GND1 through the primary winding 21 and the output switch 11, and thus electrical energy is stored in the primary winding 21.

When the output switch 11 is later turned off, the induced voltage is generated in the secondary winding 22 magnetically coupled with the primary winding 21, and a secondary current Is flows from the secondary winding 22 to the ground terminal GND2 through the diode 31 and the capacitor 32. At this point, the DC output voltage Vout obtained by rectifying and smoothing the induced voltage of the secondary winding 22 is supplied to a load (not shown).

Then, by turning on/off the output switch 11, the same switch output action as above is repeated.

As such, the insulated switching power supply 1 according to this embodiment can electrically insulate the primary circuit system and the secondary circuit system, and generate the required DC output voltage Vout from the DC input voltage Vin.

<Controller (Fundamental Structure)>

Figure 2:
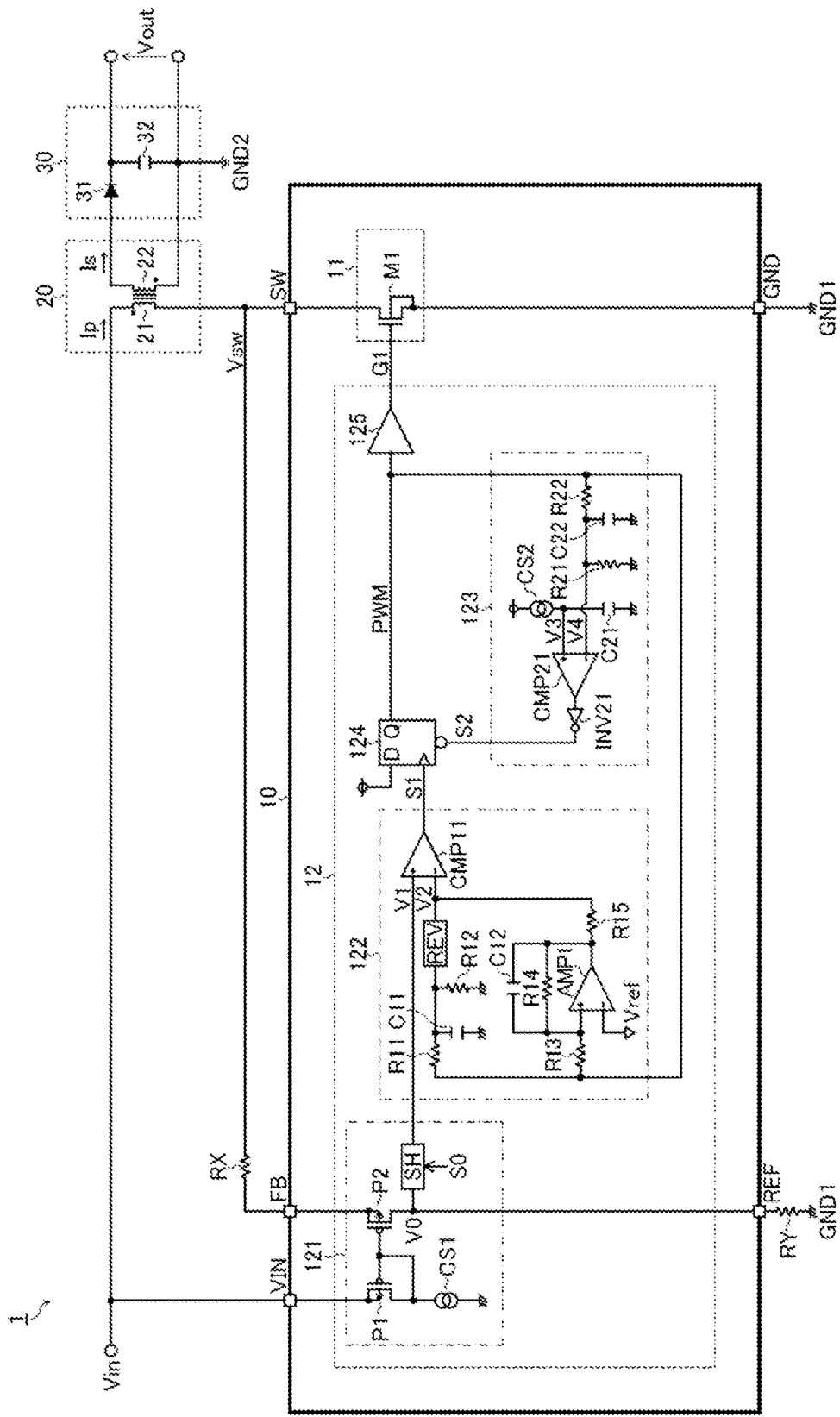
FIG. 2 is a diagram of a fundamental structure of a controller.

FIG. 2 shows a diagram of a fundamental structure of the controller 12. The controller 12 of this configuration example includes a feedback voltage generator 121, an on-timing setting unit 122, an off-timing setting unit 123, a D flip-flop 124 and a driver 125.

Moreover, in addition to the power terminal VIN, the switch terminal SW and the ground terminal GND, the semiconductor device 10 of this figure further includes a feedback terminal FB and a reference terminal REF. In addition, a resistor RX is externally connected between the feedback terminal FB and the switch terminal SW. On the other hand, a resistor RY is externally connected between the reference terminal REF and the ground terminal GND.

The feedback voltage generator 121 is a circuit block configured to generate a feedback voltage V1 by sampling a primary voltage (for example, a switch voltage Vsw that appears in the primary winding 21) of the transformer 21, and includes P-type MOSFETs P1 and P2, a current source CS1, and a sampling/hold circuit SH.

The source of the transistor P1 is connected to the power terminal VIN. The source of the transistor P2 is connected to the feedback terminal FB. The gates of the transistors P1 and P2 are both connected to the drain of the transistor P1. The drain of the transistor P1 is connected to a first terminal of the current source CS1. A second terminal of the current source CS2 is connected to the ground terminal. The drain of the transistor P2 is connected to the reference terminal REF (=an output terminal of a monitoring voltage VO). As such, the transistors P1 and P2 and the current source CS1 function as a monitoring voltage generating circuit, which generates the monitoring voltage VO corresponding to the switch voltage Vsw.

The sampling/hold circuit SH generates the feedback voltage V1 by sampling the monitoring voltage VO according to a timing control signal SO.

The on-timing setting unit 122 is a circuit block configured to turn on the output switch 11 (hence the primary current Ip of the transformer 20) according to a comparison result between the feedback voltage V1 and a sloped reference voltage V2, and includes an amplifier AMP1, a comparator CMP11, a correction circuit REV, capacitors C11 and C12, and resistors R11 to R15.

Respective first terminals of the resistors R11 and R13 are both connected to an application terminal of a pulse signal PWM (to be described in detail below). A second terminal of the resistor R11 and respective first terminals of the resistor R12 and the capacitor C11 are all connected to an input terminal of the correction circuit REV. Respective second terminals of the resistor R12 and the capacitor C11 are both connected to the ground terminal.

A second terminal of the resistor R13 and respective first terminals of the resistor R14 and the capacitor C12 are all connected to a non-inverting terminal (+) of the amplifier AMP1. Respective second terminals of the resistor R14 and the capacitor 12 and a first terminal of the resistor R15 are all connected to an output terminal of the amplifier AMP1. An inverting terminal (−) of the amplifier AMP1 is connected to an application terminal of the reference voltage Vref. An output terminal of the correction circuit REV and a second terminal of the resistor R15 both serve as an output terminal of the reference voltage V2 and are connected to an inverting input terminal (−) of the comparator CMP11. Moreover, the reference voltage V2 is in a sloped shape (CR waveform) formed by logically inverting and blunting the pulse signal PWM.

The comparator CMP11 compares the feedback voltage V1 inputted to the non-inverting terminal (+) with the reference voltage V2 inputted to the inverting input terminal (−) to generate a set signal S1 (=equivalent to a clock signal of the D flip-flop 124 below). The set signal S1 is, for example, at a high level when the feedback voltage V1 is higher than the reference voltage V2, and at a low level when the feedback voltage V1 is lower than the reference voltage V2.

The correction circuit REV corrects the reference voltage V2 (hence the on timing of the primary current Ip) according to a DC component (=equivalent to duty cycle information) of the pulse signal PWM such that a switching frequency fsw (=1/Tsw=1/(Ton+Toff)) of the insulated switching power supply 1 is kept constant.

The off-timing setting unit 123 is a circuit block configured to turn off the output switch 11 (hence the primary current Ip) after a predetermined on time (Ton) has elapsed since the output switch 11 (hence the primary current Ip) was turned on, and includes a comparator CMP21, a current source CS2, an inverter INV21, capacitors C21 and C22, and resistors R21 and R22.

A first terminal of the current source CS2 is connected to the power terminal. A second terminal of the current source CS2 and a first terminal of the capacitor C21 are both connected to an application terminal of a node voltage V3. Respective first terminals of the resistor R21 and R22 and the capacitor C22 are all connected to an application terminal of a node voltage V4. Respective second terminals of the resistor R21 and the capacitors C21 and C22 are all connected to the ground terminal. A second terminal of the resistor R22 is connected to an application terminal of the pulse signal PWM.

The comparator CMP21 compares the node voltage V3 inputted to the non-inverting input terminal (+) with the node voltage V4 inputted to the inverting input terminal (−) to generate a reset signal S2 by the inverter INV21. The reset signal S2 is, for example, at a low level when the node voltage V3 is higher than the node voltage V4, and at a high level when the node voltage V3 is lower than the node voltage V4.

When the logic level of the set signal S1 inputted to the clock terminal is switched (for example, reducing to a low level), the D flip-flop 124 sets the logic level of the pulse signal PWM outputted from an output terminal (Q) to an input value (for example, a high level) of a data terminal (D); on the other hand, when the logic level of the reset signal S2 inputted to a reset terminal is switched (for example, reducing to a low level), the D flip-flop 124 resets the logic level of the pulse signal PWM outputted from the output terminal (Q) to a predetermined value (for example, a low level).

The driver 125 generates the gate signal G1 of the output switch 11 according to the pulse signal PWM. For example, the driver 125 causes the gate signal G1 to be at a high level to turn on the output switch 11 when the pulse signal PWM is at a high level, and on the other hand causes the gate signal G1 to be at a low level to turn off the output switch 11 when the pulse signal PWM is at a low level.

<Constant on Time Control>

Figure 3:
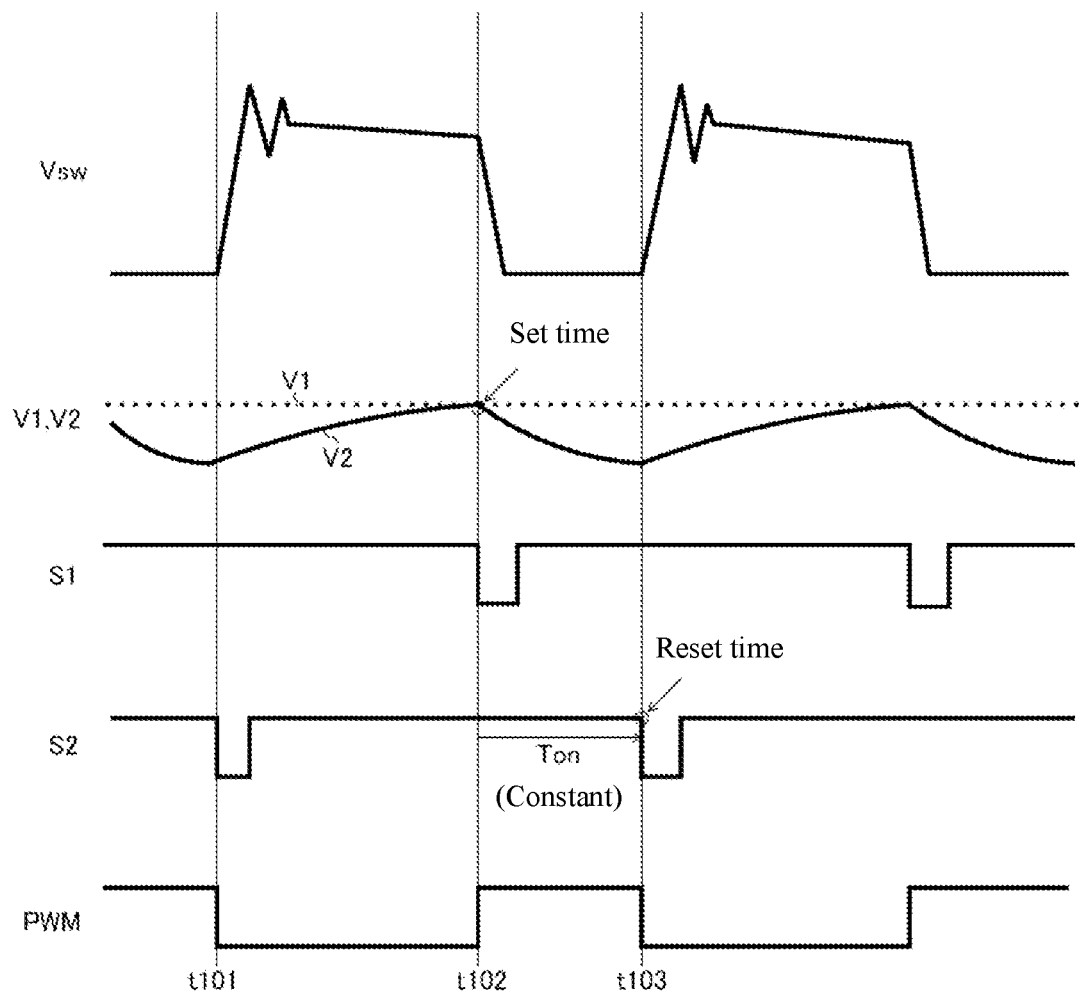
FIG. 3 is a diagram of fundamental actions of constant on time control.

FIG. 3 shows a diagram of fundamental actions of constant on time control, and sequentially depicts from top to bottom the switch voltage Vsw, the feedback voltage V1, the reference voltage V2, the set signal S1, the reset signal S2, and the pulse signal PWM.

At a timing t101, when the reset signal S2 drops to a low level, the pulse signal PWM is reset to a low level. As a result, the output switch 11 is turned off, and so the switch voltage Vsw rises from a low level to a high level. Moreover, at the timing t101, as the pulse signal PWM lowers, the reference voltage V2 changes from falling to rising. However, since the reference voltage V2 is lower than the feedback voltage V1, the set signal is kept at a high level.

At a timing t102, when the reference voltage V2 is higher than the feedback voltage V1, the set signal S1 drops to a low level, and so the pulse signal PWM is set to a high level. As a result, the output switch 11 is turned on, and so the switch voltage Vsw falls from a high level to a low level. Moreover, at the timing t102, as the pulse signal PWM rises, the reference voltage V2 changes from rising to falling.

At a timing t103, after the predetermined on time Ton has elapsed from the on-timing (=at the timing t102) of the output switch 11, the reset signal S2 drops to a low level. As a result, the same as the timing t101, the pulse signal PWM is reset to a low level, and so the output switch 11 is turned off and the switch voltage Vsw rises to a high level, and the reference voltage V2 changes from falling to rising.

The series of actions are repeated after the timing t103, and the insulated switching power supply 1 accordingly generates the required DC output voltage Vout from the DC input voltage Vin by means of the constant on time control.

<Observations Related to Sampling Timing>

In the insulated switching power supply 1, by monitoring the switch voltage Vsw including information of the DC output voltage Vout, output feedback control can be performed by only the primary circuit system without involving any photoelectric couplers. The switch voltage Vsw may be expressed by equation (1) below. Moreover, the symbol Vf in the equation represents a forward voltage drop of the diode 31, and the symbol ESR represents a total impedance (impedance components of the secondary winding 22 and the substrate) of the secondary circuit system.

$$Vsw = Vin + (Np/Ns) \times (Vout + Vf + Is \times ESR) \quad (1)$$

It is known from equation (1), in addition to the DC output voltage Vout, the switch voltage Vsw further includes a parameter (=Vf+Is ×ESR) dependent on the secondary current Is. Therefore, ideally, the switch voltage Vsw is sampled during the timing in which the secondary current Is does not flow at all.

Figure 4:
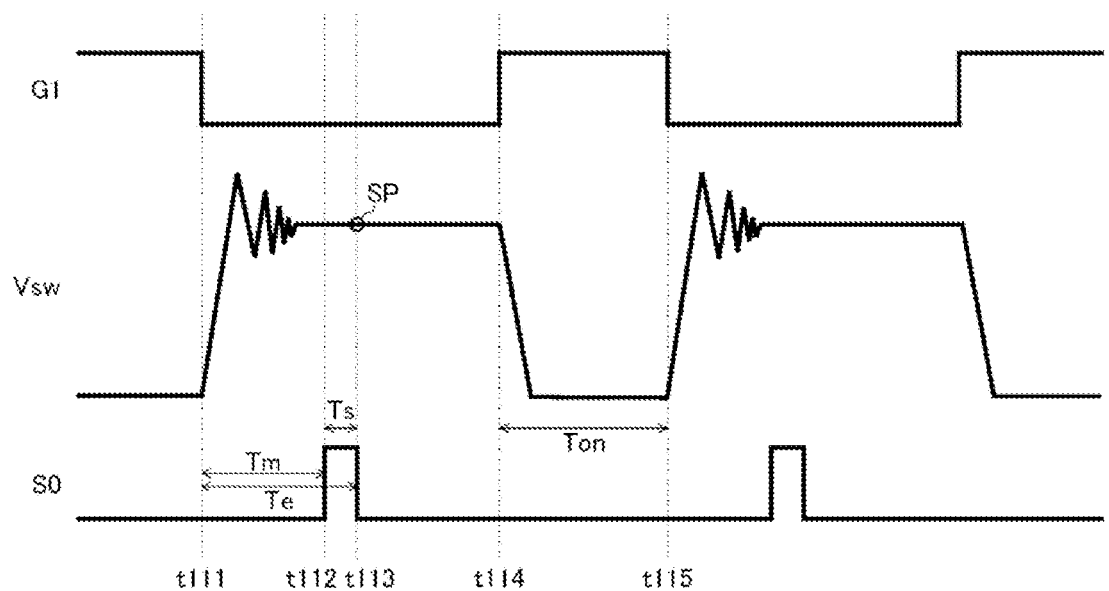
FIG. 4 is a diagram of sampling timing control (CCM) according to the first embodiment.
Figure 5:
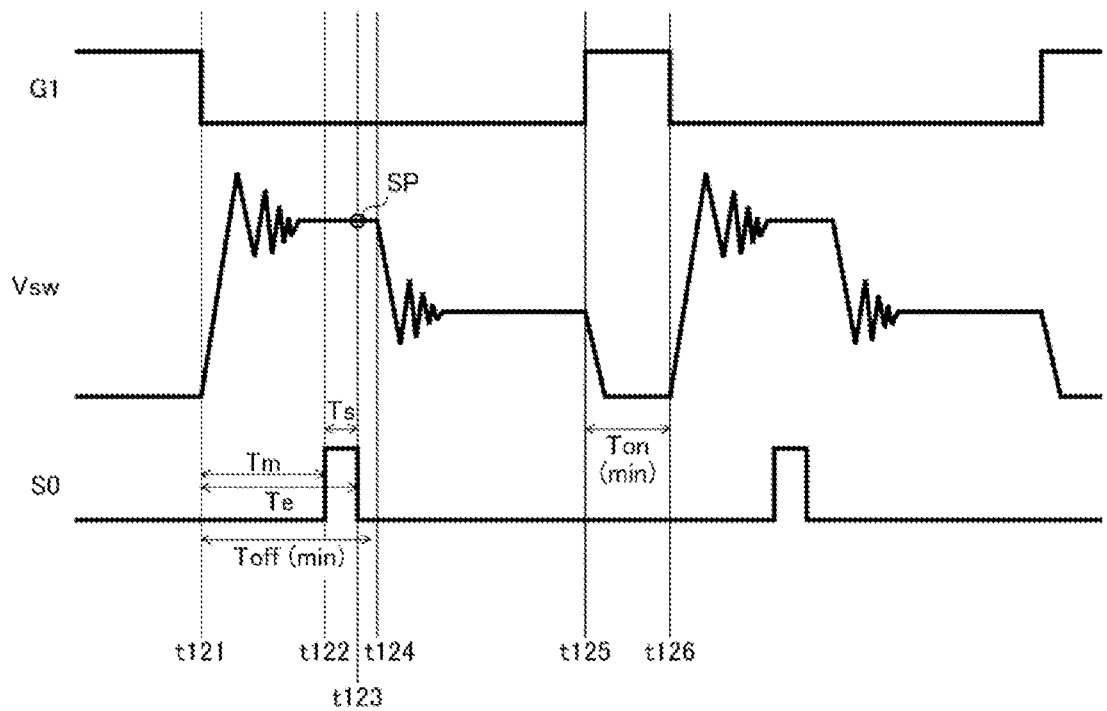
FIG. 5 is a diagram of sampling timing control (DCM) according to the first embodiment.

FIG. 4 and FIG. 5 show sampling timing control (continuous current mode (CCM) shown in FIG. 4, and discontinuous current mode (DCM) shown in FIG. 5) of the switch voltage Vsw in the insulated switching power supply 1 according to the first embodiment, and sequentially depict from top to bottom the gate signal G1, the switch voltage Vsw, and the timing control signal S0.

As shown in the two drawings, in the insulated switching power supply 1 of the first embodiment, the rising timing (=sampling starting timing) and falling timing (sampling ending timing) of the timing control signal S0 are both set by using the falling timing (=the off-timing of the primary current Ip) of the gate signal G1 as a reference.

More specifically, the timing control signal S0 is at a high level after a predetermined mask time Tm has elapsed since the gate signal G1 drops to a low level, and is at a low level after a predetermined sampling time Te has elapsed (wherein Tm<Te<Toff (min)). For example, when Tm=350 ns and Te=430 ns, Ts=80 μs (=Te−Tm). Moreover, the circular dot SP in the two drawings represents a sample value of the switch voltage Vsw.

As such, to sample the switch voltage Vsw, it is waited until at least the predetermined mask time Tm has elapsed after the output switch 11 (hence the primary current Ip) is turned off, so that the influence of ringing generated in the switch voltage Vsw are minimized.

Moreover, feedback control is performed on the on time Ton of the output switch 11 (hence the primary current Ip) such that the switch frequency fsw is kept constant. For example, in the continuous current mode CCM, Ton=1 μs (@Don=40%), and in the discontinuous current mode DCM, Ton (min)=350 ns.

As such, in order to keep the switch frequency fsw constant in the continuous current mode CCM, the insulated switching power supply 1 of the first embodiment sets a constant sampling time Ts using the off timing of the output switch 11 as a reference, and accordingly, the switch voltage Vsw is sampled in a manner completely independent from the on timing of the output switch 11.

Figure 6:
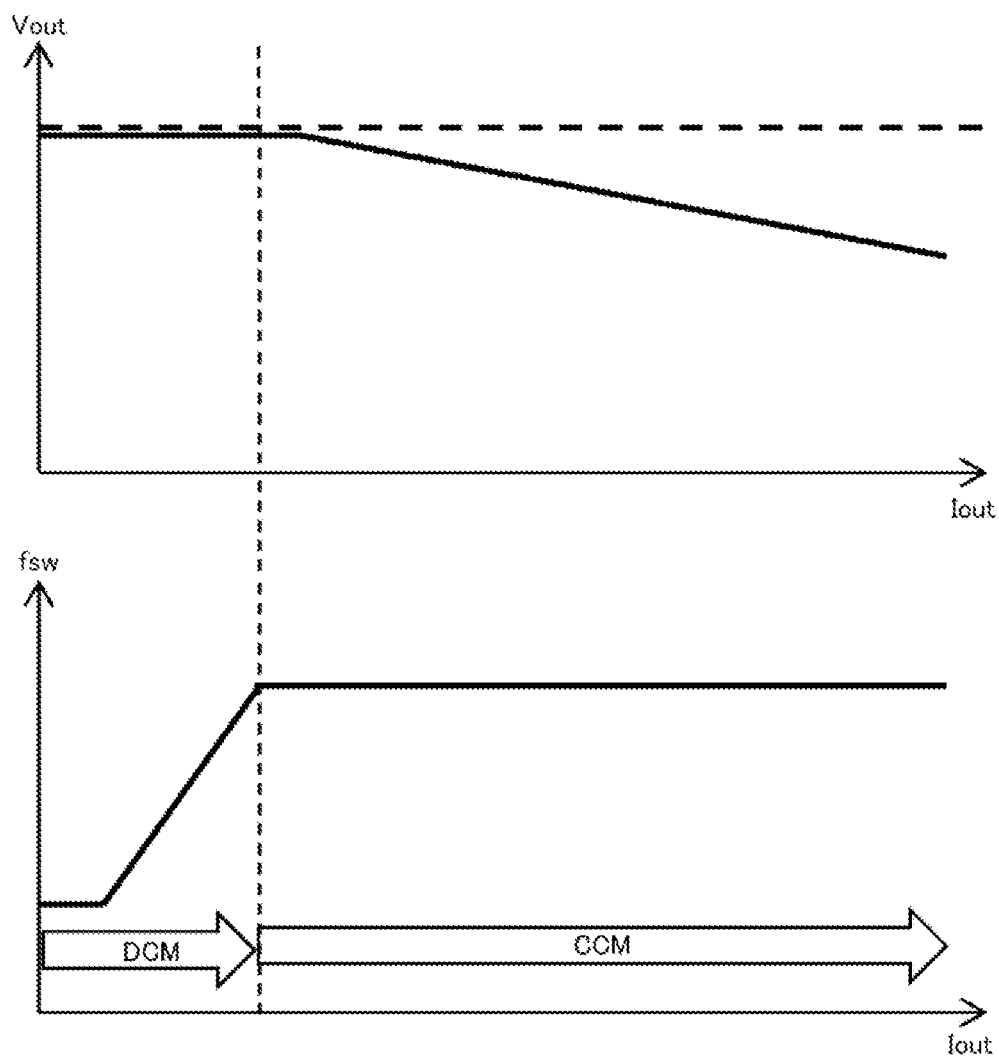
FIG. 6 is a diagram of a load regulation rate and frequency characteristics according to the first embodiment.

FIG. 6 shows a diagram of a load regulation rate (the upper part) and frequency characteristics (the lower part) according to the first embodiment. As shown in the drawing, in the continuous current mode CCM, the insulated switching power supply 1 of the first embodiment is capable of keeping the switch frequency fsw constant, thereby facilitating an anti-noise design. However, on the other hand, the DC output voltage Vout may become shifted from a target value (the reference dotted line) as the output current Iout increases.

Figure 7:
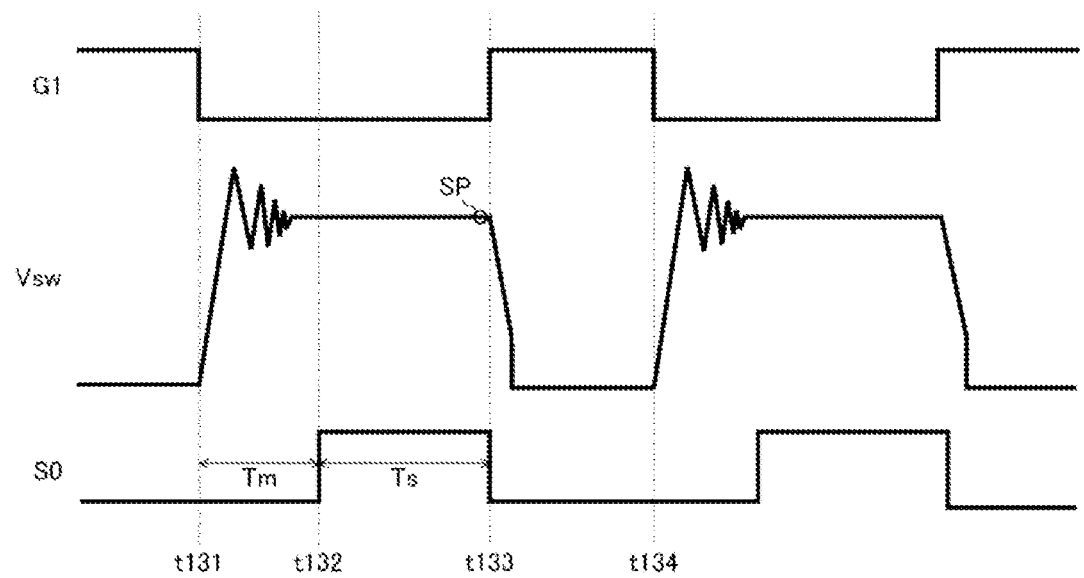
FIG. 7 is a diagram of sampling timing control (BCM) of another approach.
Figure 8:
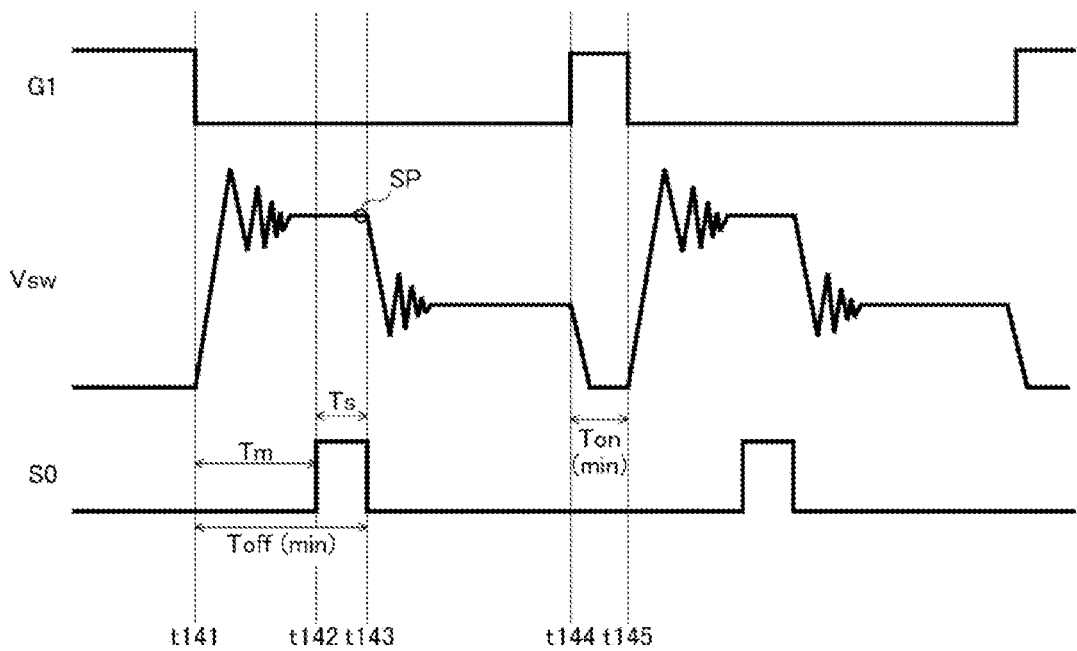
FIG. 8 is a diagram of sampling timing control (DCM) of another approach.

FIG. 7 and FIG. 8 show approaches of sampling timing control (a boundary current mode (BCM) shown in FIG. 7, and a discontinuous current mode (DCM) shown in FIG. 8) different from that of the first embodiment, and sequentially depict from top to bottom the gate signal G1, the switch voltage Vsw, and the timing control signal S0.

In the sampling timing control of this approach, when it is detected that the primary current Ip no longer flows (that is, the switch voltage Vsw starts dropping), the switch voltage Vsw is sampled.

Figure 9:
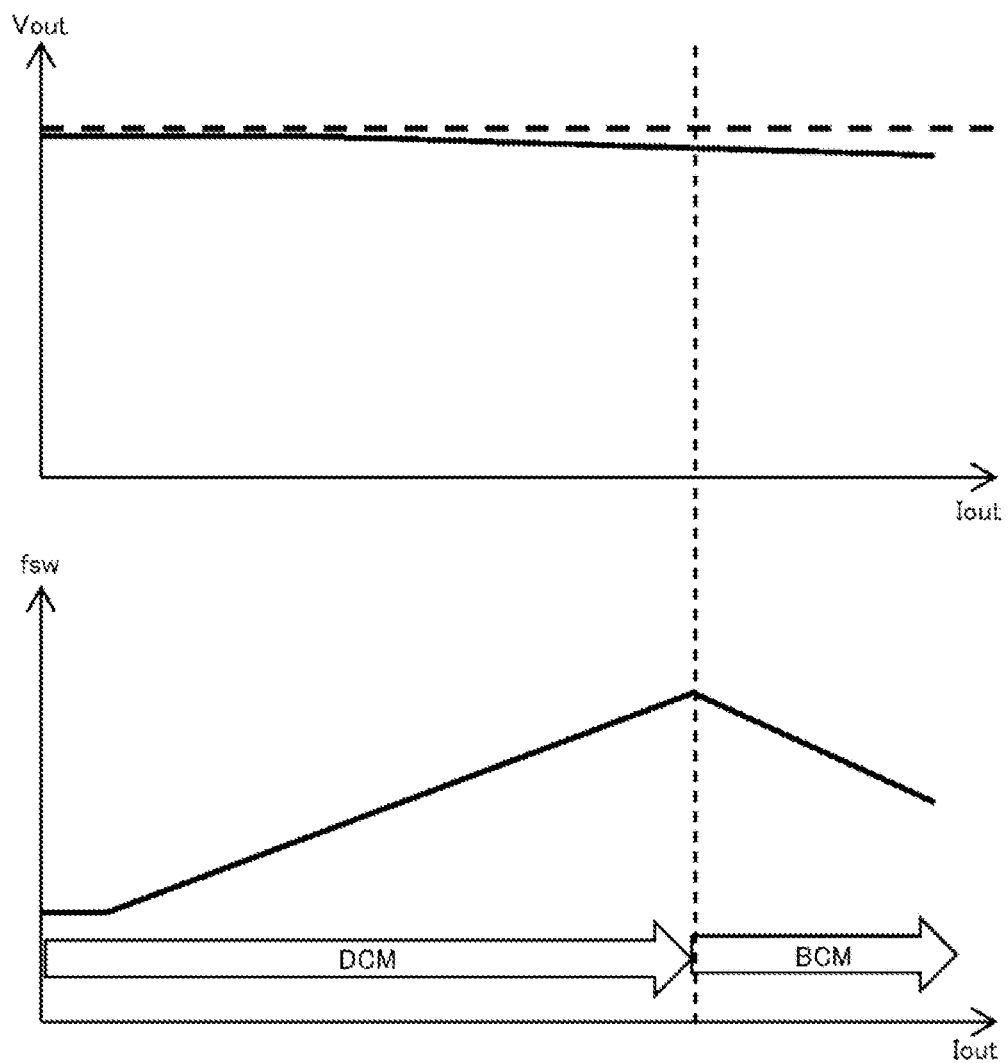
FIG. 9 is a diagram of a load regulation rate and frequency characteristics of another approach.

FIG. 9 shows a diagram of a load regulation rate (the upper part) and frequency characteristics (the lower part) of another approach of FIG. 7 and FIG. 8. As shown in the drawing, if the sampling timing control of this approach is used, it is demonstrated that the DC output current Vout is less likely to shift from the target value. However, since the switch frequency fsw is not a constant value, the anti-noise design may be challenging, and the ripple component in the DC output voltage Vout is also increased.

On the basis of the observations above, a novel implementation capable of inhibiting the change in the switch frequency fsw while enhancing the load regulation rate is provided below.

Second Embodiment

Figure 10:
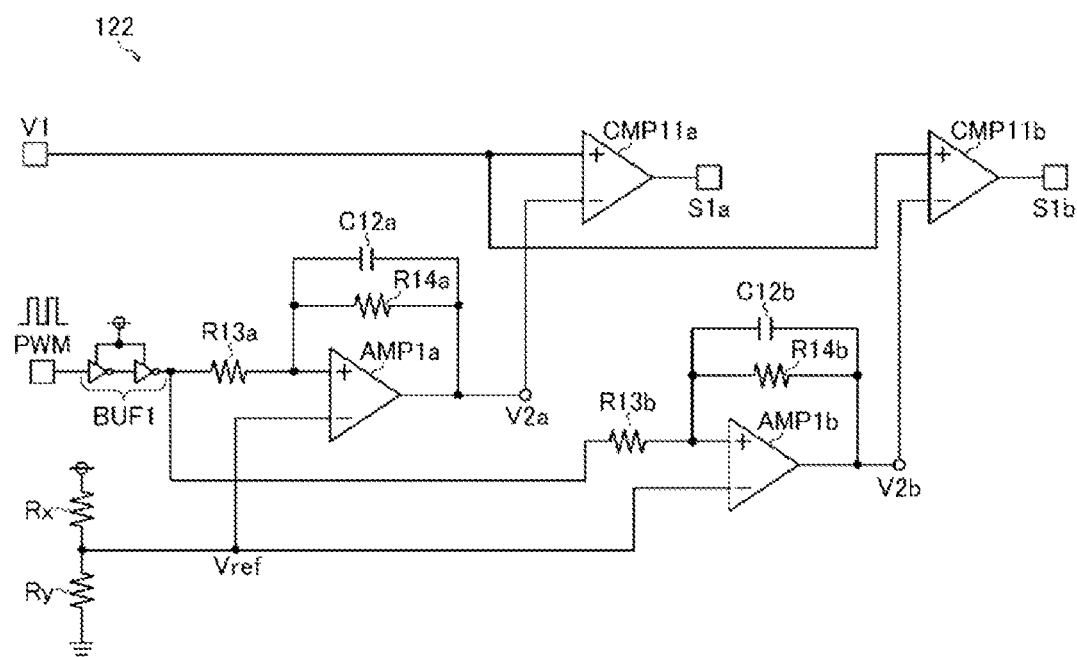
FIG. 10 is a diagram of an insulated switching power supply according to second embodiment.

FIG. 10 shows a diagram of an insulated switching power supply 1 according to a second embodiment (particularly a novel configuration of the on-timing setting unit 122). In the insulated switching power supply 1 of this embodiment, the on-timing setting unit 122 includes amplifiers AMP1a and AMP1b, comparators CMP11a and CMP11b, a buffer BUF1, capacitors C12a and C12b, resistors R13a and R13b, resistors R14a and R14b, and resistors Rx and Ry. The on-timing setting unit 122 may further include the correction circuit REV.

An input terminal of the buffer BUF1 (a multi-cascaded inverter in the drawing) is connected to an application terminal of the pulse signal PWM. An output terminal of the buffer BUF1 is connected to respective first terminals of the resistors R13a and R13b. Moreover, the buffer BUF1 may be omitted.

The resistors Rx and Ry are connected in series between an internal power terminal and a ground terminal, and function as voltage dividers outputting the reference voltage Vref from a connection node in between.

A second terminal of the resistor R13a and respective first terminals of the resistor R14a and the capacitor C12a are all connected to a non-inverting terminal (+) of the amplifier AMP1a. Respective second terminals of the resistor R14a and the capacitor 12a are both connected to an output terminal of the amplifier AMP1a. An inverting input terminal (−) of the amplifier AMP1a is connected to an application terminal of the reference voltage Vref. An output terminal of the amplifier AMP1a serves as an output terminal of the reference voltage V2a and is connected to an inverting terminal (−) of the comparator CMP11a.

A second terminal of the resistor R13b and respective first terminals of the resistor R14b and the capacitor C12b are all connected to a non-inverting input terminal (+) of the amplifier AMP1b. Respective second terminals of the resistor R14b and the capacitor 12b are both connected to an output terminal of the amplifier AMP1b. An inverting input terminal (−) of the amplifier AMP1b is connected to an application terminal of the reference voltage Vref. An output terminal of the amplifier AMP1b serves as an output terminal of a reference voltage V2b and is connected to an inverting input terminal (−) of the comparator CMP11b.

Moreover, the reference voltages V2a and V2b are both in sloped shapes (CR waveforms) formed by logically inverting and blunting the common pulse signal PWM. That is, the reference voltages V2a and V2b are synchronous and pairing with each other, and change periodically. However, the reference voltage V2b is adjusted to have an intersection with the feedback voltage V1 at a timing earlier than the reference voltage V2a. For example, in a method for adjusting the reference voltages V2a and V2b, resistance values or capacitance values connected to the amplifiers AMP1a and AMP1b may be adjusted, or input compensation values of the amplifiers AMP1a and AMP1b may be adjusted.

The comparator CMP11a compares the feedback voltage V1 inputted to the non-inverting input terminal (+) with the reference voltage V2a inputted to the inverting input terminal (−1) to generate a set signal S1a. The set signal S1a is, for example, at a high level when the feedback voltage V1 is higher than the reference voltage V2a, and at a low level when the feedback voltage V1 is lower than the reference voltage V2a. Moreover, the set signal S1a is equivalent to a clock signal of the D flip-flop 124. That is, the on-timing of the output switch 11 (hence the primary current Ip) is determined by an intersection timing of the feedback voltage V1 and the reference voltage V2a.

The comparator CMP11b compares the feedback voltage V1 inputted to the non-inverting input terminal (+) with the reference voltage V2b inputted to the inverting input terminal (−1) to generate a set signal S1b. The set signal S1b is, for example, at a high level when the feedback voltage V1 is higher than the reference voltage V2b, and at a low level when the feedback voltage V1 is lower than the reference voltage V2b. Moreover, the set signal S1b is equivalent to a reference signal of the timing control signal S0. That is, the sampling timing of the monitoring voltage V0 (hence the switch voltage Vsw) is determined by the intersection timing of the feedback voltage V1 and the reference voltage V2b.

<Sampling Timing>

Figure 11:
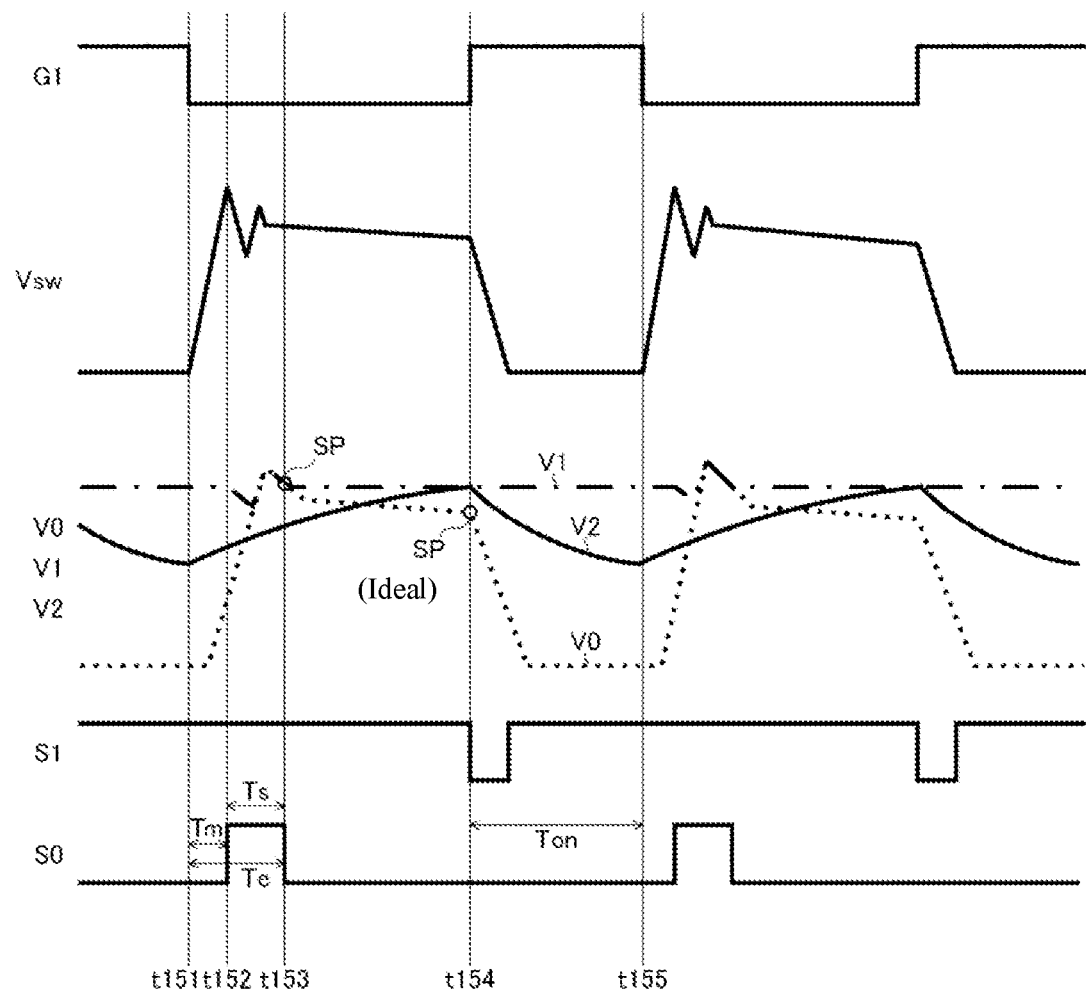
FIG. 11 is a diagram of issues of the first embodiment.

FIG. 11 shows a diagram illustrating the issue of the first embodiment (FIG. 2) described above, and sequentially depicts from top to bottom the gate signal G1, the switch voltage Vsw, the monitoring voltage V0 (the dotted line), the feedback voltage V1 (the dash-dotted line), the reference voltage V2 (the solid line), the set signal S1, and the timing control signal S0.

At a timing t151, when the gate signal G1 drops to a low level, the output switch 11 (hence the primary current Ip) is turned off, and so the switch voltage Vsw rises to a high level. At this point, the switch voltage Vsw generates ringing, the timing control signal S0 however does not rise, and sampling of the switch voltage Vsw is awaited until at least the mask time Tm has elapsed. Thus, the feedback voltage V1 is unlikely to be affected by the ringing.

After the mask time Tm has elapsed from the timing t151, at a timing t152, the timing control signal S0 rises to a high level, and sampling of the switch voltage Vsw starts.

Moreover, after the sampling ending time Te has elapsed from the timing t151, at a timing t153, the timing control signal S0 drops to a low level, and sampling of the switch voltage Vsw ends. That is, the voltage value of the monitoring voltage V0 at the timing t153 is kept as the voltage value of the feedback voltage V1. At that timing, since the feedback voltage V1 is higher than the reference voltage V2, the set signal S1 is kept at a high level.

At a timing t154, when the reference voltage V2 is higher than the feedback voltage V1, the set signal S1 drops to a low level. As a result, the gate signal G1 is set to a high level and the output switch 11 (hence the primary current Ip) is turned on, and so the switch voltage Vsw drops to a low level.

Then, after the on time Ton has elapsed from the timing t154, at a timing t155, the gate signal G1 is reset to a low level. The series of actions are repeated after that, and the insulated switching power supply 1 accordingly generates the required DC output voltage Vout from the DC input voltage Vin by means of the constant on time control.

Moreover, as shown in the drawing, the insulated switching power supply 1 of the first embodiment sets a constant sampling time Ts (=Te−Tm) using the off timing (=the timing t151) of the output switch 11 as a reference, and accordingly, the switch voltage Vsw is sampled in a manner completely independent from the on timing (=the timing t154) of the output switch 11. Thus, the actual sampling ending timing (the circular dot SP) of the switch voltage Vsw is shifted from the ideal sampling ending timing (the circular dot SP (ideal)).

Figure 12:
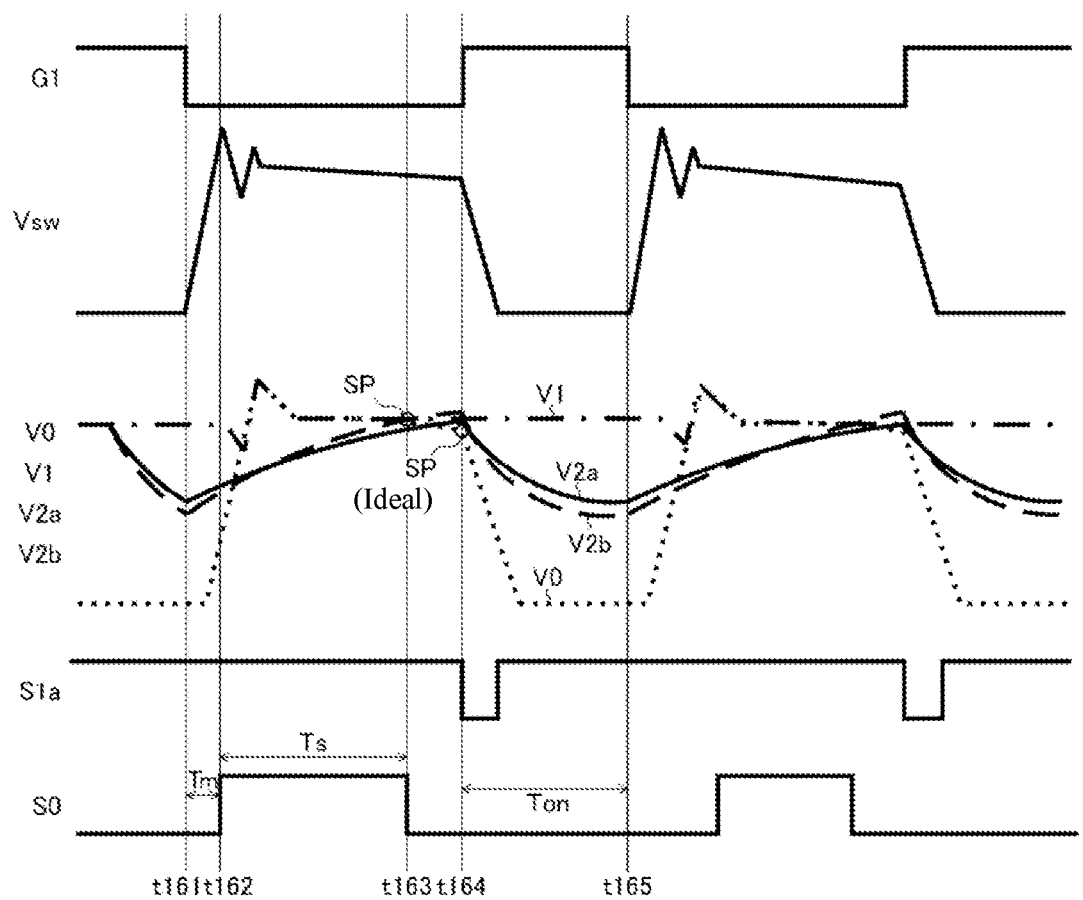
FIG. 12 is a diagram of sampling timing control (CCM) according to the second embodiment.

FIG. 12 shows a diagram of sampling timing control (CCM) of the second embodiment, and sequentially depicts from top to bottom the gate signal G1, the switch voltage Vsw, the monitoring voltage V0 (the dotted line), the feedback voltage V1 (the dash dotted line), the reference voltage V2a (the solid line), the reference voltage V2b (the dashed line), the set signal S1a, and the timing control signal S0.

At a timing t161, when the gate signal G1 drops to a low level, the output switch 11 (hence the current Ip) is turned off, and so the switch voltage Vsw rises to a high level. At this point, the switch voltage Vsw generates ringing, the timing control signal S0 however does not rise, and sampling of the switch voltage Vsw is awaited until at least the mask time Tm has elapsed. Thus, the feedback voltage V1 is unlikely to be affected by the ringing.

After the mask time Tm has elapsed from the timing t161, at a timing t162, the timing control signal S0 rises to a high level, and sampling of the switch voltage Vsw starts. The actions up to this point are not particularly different from those of the first embodiment (FIG. 11).

Moreover, at a timing t163, when the reference voltage V2b is higher than the feedback voltage V1 (=the monitoring voltage V0), a set signal S1b (not shown) is at a low level, and so the timing control signal S0 drops to a low level, and sampling of the switch voltage Vsw ends. That is, the voltage value of the monitoring voltage V0 at the timing t163 is kept as the voltage value of the feedback voltage V1. However, at that timing, since the feedback voltage V1 is higher than the reference voltage V2a, the set signal S1a is kept at a high level.

At a timing t164, when the reference voltage V2a is higher than the feedback voltage V1, the set signal S1a drops to a low level. As a result, the gate signal G1 is set to a high level and the output switch 11 (hence the primary current Ip) is turned on, and so the switch voltage Vsw drops to a low level.

Then, after the on time Ton has elapsed from the timing t164, at a timing t165, the gate signal G1 is reset to a low level. The series of actions are repeated after that, and the insulated switching power supply 1 accordingly generates the required DC output voltage Vout from the DC input voltage Vin by means of the constant on time control.

As such, the insulated switching power supply 1 of the second embodiment does not use the off timing (=the timing t161) of the output switch 11 as a reference, but uses the on timing (=the timing t164) of the output switch 11 as a reference to set the sampling timing of the switch voltage Vsw. Thus, the actual sampling ending timing (the circular dot SP) of the switch voltage Vsw is allowed to approach the ideal sampling ending timing (the circular dot SP (ideal)).

Moreover, in FIG. 12, the intersection timing of the feedback voltage V1 and the reference voltage V2b is set as the sampling ending timing; however, for example, the sampling may also end after a predetermined time (for example, tens of ns) has elapsed from the intersection timing.

In addition, for example, information in a certain cycle related to the intersection timing may be preserved in advance, and the sampling timing of the next cycle is then set accordingly. Specifically, the time needed from the off timing of the output switch 11 to the intersection timing may be counted, and at least one of the sampling starting timing and the sampling ending timing of the next cycle may be set according to the count value.

In addition, in a variation of the second embodiment, three or more reference voltages V2 may be prepared in advance, and a slope operation is performed on the monitoring voltage V0 (hence the switch voltage Vsw).

Figure 13:
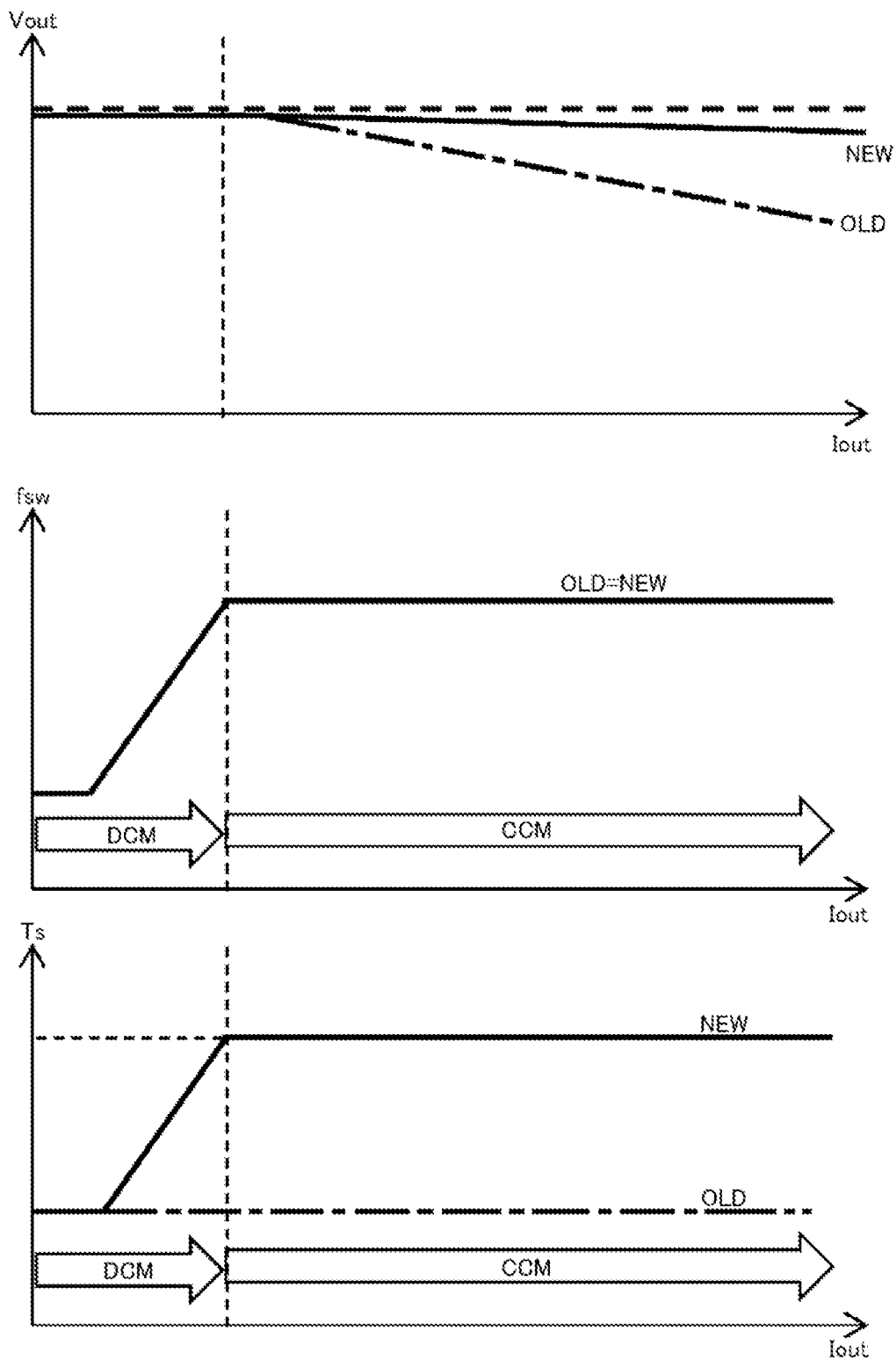
FIG. 13 is a diagram of a load regulation rate, frequency characteristics and sampling time according to the second embodiment.

FIG. 13 shows a diagram of a load regulation rate (the upper part), frequency characteristics (the middle part) and sampling time (the lower part) according to the second embodiment. Moreover, the solid lines in the drawing represent behaviors of the second embodiment, and the dotted lines used for comparing represents the behaviors of the first embodiment.

As shown in the drawing, in the continuous current mode CCM, the insulated switching power supply 1 of the second embodiment is capable of keeping the switch frequency fsw constant, thereby facilitating an anti-noise design. In addition, different from the first embodiment (the dotted lines), even if the output current Iout is increased, the DC output voltage Vout are unlikely to be shifted from the target value (the reference dotted line). That is, the change in the switch frequency fsw is inhibited while the load regulation rate is enhanced.

Moreover, in a configuration where the sampling timing of the switch voltage Vsw is set by using the on timing of the output switch 11 as a reference, the switch frequency fsw can easily be allowed to be a high frequency (for example, fsw=400 kHz→2 MHz).

Third Embodiment

Figure 14:
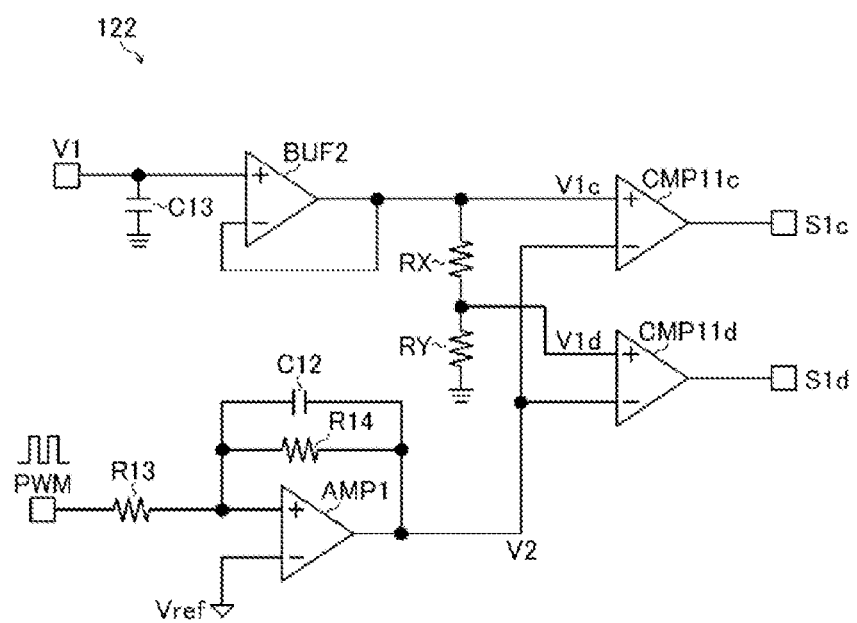
FIG. 14 is a diagram of an insulated switching power supply according to third embodiment.

FIG. 14 shows a diagram of an insulated switching power supply 1 according to third embodiment (particularly a novel configuration of the on-timing setting unit 122). In the insulated switching power supply 1 of this embodiment, the on-timing setting unit 122 includes an amplifier AMP1, comparators COM11c and CMP11d, a buffer BUF2, capacitors C12 and C13, resistors R13 and R14, and resistors RX and RY. The on-timing setting unit 122 may further include the correction circuit REV.

A non-inverting input terminal (+) of the buffer BUF2 and a first terminal of the capacitor C13 are both connected to an application terminal of the feedback voltage V1. A second terminal of the capacitor C13 is connected to a ground terminal. An inverting terminal (−) of the buffer BUF2 is connected to an output terminal of the buffer BUF2. The buffer BUF2 connected as above buffers and amplifies the feedback voltage V1 to generate the feedback voltage Vic. Moreover, the buffer BUF2 and the capacitor C13 may be omitted.

The resistors RX and RY are connected in series between the output terminal (=an application terminal of the feedback voltage Vc1) of the buffer BUF2 and the ground terminal, and function as voltage dividers outputting a feedback voltage V1$d$ (=a divided voltage of the feedback voltage Vc1) from a mutual connection node in between. That is, the feedback voltage V1$d$ is adjusted to have an intersection with the reference voltage V2 at a timing earlier than the feedback voltage Vic.

A first terminal of the resistor R13 is connected to an application terminal of the pulse signal PWM. A second terminal of the resistor R13 and respective first terminals of the resistor R14 and the capacitor C12 are all connected to a non-inverting terminal (+) of the amplifier AMP1. Respective second terminals of the resistor R14 and the capacitor 12 are both connected to an output terminal of the amplifier AMP1. An inverting input terminal (−) of the amplifier AMP1 is connected to an application terminal of the reference voltage Vref. An output terminal of the amplifier AMP1 serves as an output terminal of the reference voltage V2 and is connected to inverting input terminals (−) of the comparators CMP11$c$ and CMP11$d$.

The comparator CMP11$c$ compares the feedback voltage V1$c$ inputted to the non-inverting input terminal (+) with the reference voltage V2 inputted to the inverting input terminal (−) to generate a set signal S1$c$. The set signal S1$c$ is, for example, at a high level when the feedback voltage V1$c$ is higher than the reference voltage V2, and at a low level when the feedback voltage V1$c$ is lower than the reference voltage V2. Moreover, the set signal S1$c$ is equivalent to a clock signal of the D flip-flop 124. That is, the on timing of the output switch 11 (hence the primary current Ip) is determined by an intersection timing of the feedback voltage V1$c$ and the reference voltage V2.

The comparator CMP11$d$ compares the feedback voltage V1$d$ inputted to the non-inverting input terminal (+) with the reference voltage V2 inputted to the inverting input terminal (−) to generate a set signal S1$d$. The set signal S1$d$ is, for example, at a high level when the feedback voltage V1$d$ is higher than the reference voltage V2, and at a low level when the feedback voltage V1$d$ is lower than the reference voltage V2. Moreover, the set signal S1$d$ is equivalent to a reference signal of the timing control signal S0. That is, the sampling timing of the monitoring voltage V0 (hence the switch voltage Vsw) is determined by an intersection timing of the feedback voltage V1$d$ and the reference voltage V2.

Figure 15:
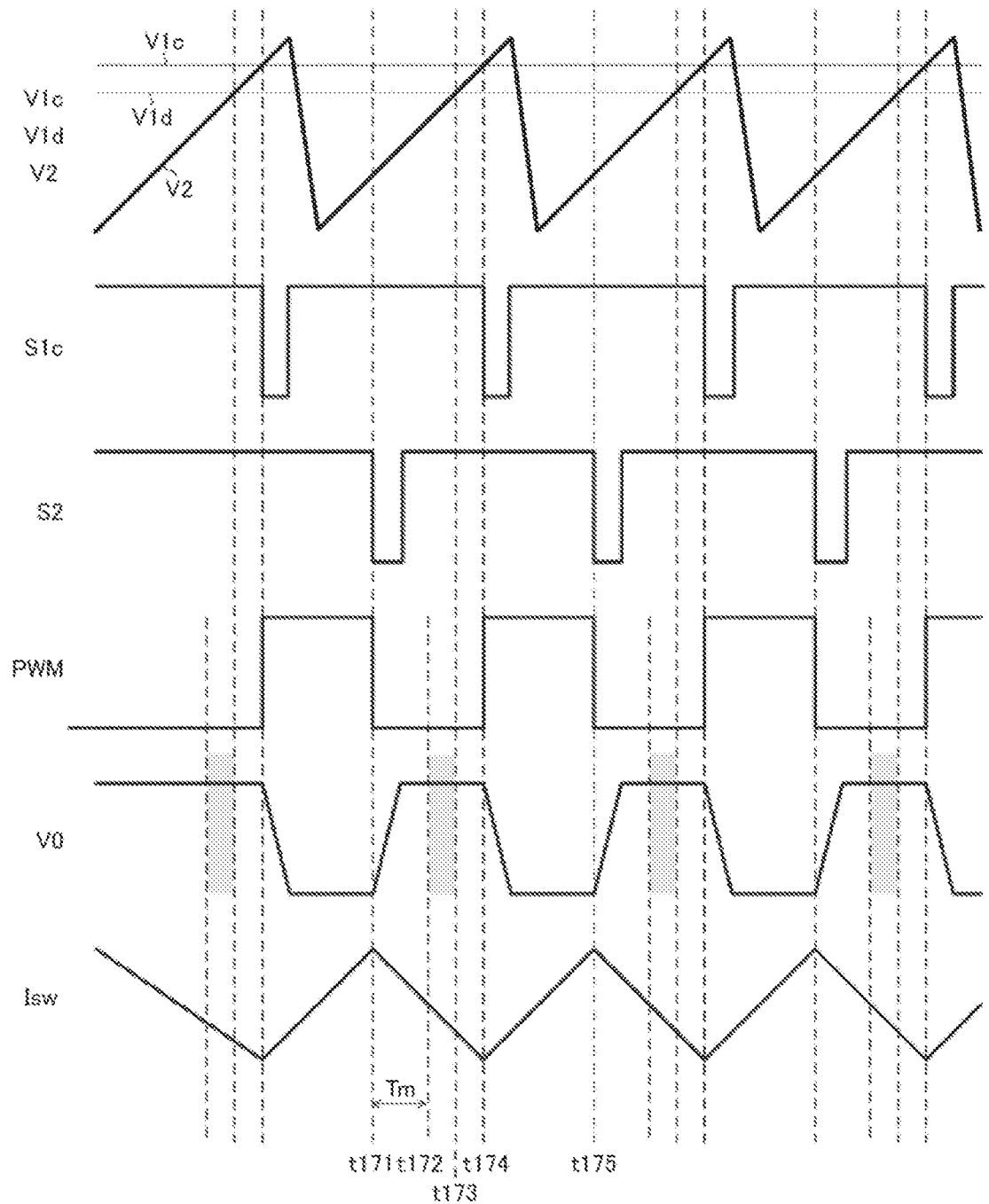
FIG. 15 is a diagram of sampling timing control (CCM) according to the third embodiment.

FIG. 15 shows a diagram of sampling timing control (CCM) according to the third embodiment of the present disclosure, and depicts from top to bottom the feedback voltages V1$c$ and V1$d$ (the thin lines), the reference voltage V2 (the thick line), the set signal S1$c$, the reset signal S2, the pulse signal PWM, the monitoring signal V0, and the switch current Isw (=the current flowing in the output switch 11).

At a timing t171, when the reset signal S2 drops to a low level, the pulse signal PWM is reset to a low level and the output switch 11 (hence the primary current Ip) is turned off, and so the switch voltage Vsw (hence the monitoring voltage V0) rises to a high level.

After the mask time Tm has elapsed from the timing t171, at a timing t172, sampling of the switch voltage Vsw (hence the monitoring voltage V0) starts.

In addition, at a timing t173, when the reference voltage V2 is higher than the feedback voltage V1$d$, the set signal S1$d$ (not shown) drops to a low level, and sampling of the switch voltage Vsw (hence the monitoring voltage V0) ends. That is, the voltage value of the monitoring voltage V0 at the timing t173 is kept as the voltage value of the feedback voltage Vic. At that timing, since the feedback voltage V1$c$ is higher than the reference voltage V2, the set signal S1$c$ is kept at a high level.

At a timing t174, when the reference voltage V2 is higher than the feedback voltage Vic, the set signal S1$c$ drops to a low level. As a result, the pulse signal PWM is set to a high level and the output switch 11 (hence the primary current Ip) is turned on, and so the switch voltage Vsw (hence the monitoring voltage V0) drops to a low level.

Then, after the on time Ton has elapsed from the timing t174, at a timing t175, the pulse signal PWM is reset to a low level. The series of actions are repeated after that, and the insulated switching power supply 1 accordingly generates the required DC output voltage Vout from the DC input voltage Vin by means of the constant on time control.

As such, the insulated switching power supply 1 of the third embodiment, similar to the second embodiment (FIG. 10), uses the on timing (=the timing t174) of the output switch 11 as a reference to set the sampling timing of the switch voltage Vsw. Thus, the actual sampling ending timing of the switch voltage Vsw is allowed to approach the ideal sampling ending timing (=before the on-timing of the output switch 11).

Moreover, in the drawing, the intersection timing of the feedback voltage V1$d$ and the reference voltage V2 is set as the sampling ending timing; however, for example, the sampling may also end after a predetermined time (for example, tens of ns) has elapsed from the intersection timing.

In addition, for example, information in a certain cycle related to the intersection timing may be preserved in advance, and the sampling timing of the next cycle is then set accordingly. Specifically, the time needed from the off timing of the output switch 11 to the intersection timing may be counted, and at least one of the sampling starting timing and the sampling ending timing of the next cycle may be set according to the count value. Such perspective is the same as the first embodiment (FIG. 10) described above.

<Application in Vehicle>

Figure 16:
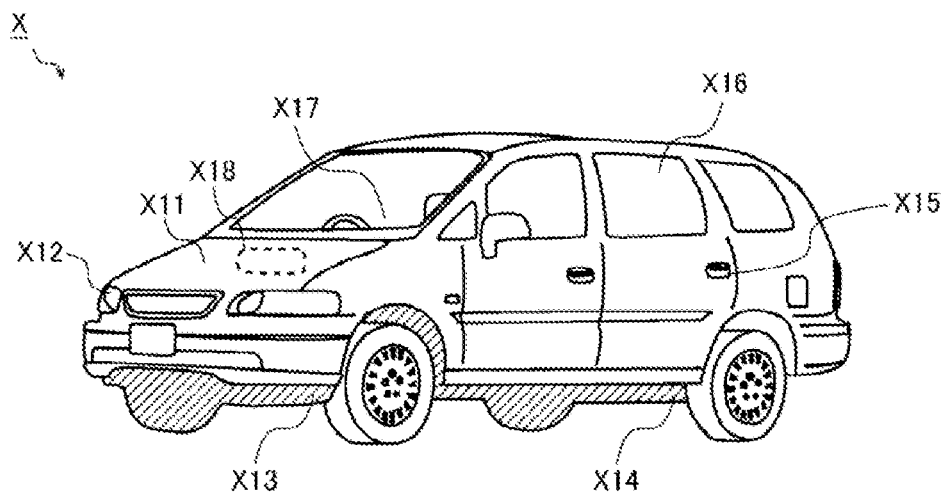
FIG. 16 is a diagram of an appearance of a vehicle.

FIG. 16 shows a diagram of an appearance of a vehicle mounted with an electronic apparatus. The vehicle X of this configuration example is mounted with various electronic apparatuses X11 to X18, and these electronic apparatuses X11 to X18 receive electrical power from a battery not shown to operate accordingly. Moreover, for illustration purposes, the positions for mounting these electronic apparatuses X11 to X18 in the drawing may not be exactly as those in an actual situation.

The electronic apparatus X11 is an engine control unit, and performs engine-related control (jet control, electronic air valve control, idle speed control, oxygen sensor heater control, and automatic cruise control).

The electronic apparatus X12 is a lamp control unit, and performs dimming and lighting control of a high intensity discharged lamp (HID) or a daytime running lamp (DRL).

The electronic apparatus X13 is a speed variator control unit, and performs speed variator-related control.

The electronic apparatus X14 is a braking unit, and performs motion-related control of the vehicle X such as an anti-lock brake system (ABS), electric power steering (EPS), and electronic suspension control.

The electronic apparatus X15 is a safety control unit, and performs driving control such as door lock and antitheft alarm.

The electronic apparatus 16X is, for example, an electronic apparatuses including a wiper, power rearview mirror, power window, damper (shock absorber), power sunroof, and power seat, and is assembled on the vehicle X at the factory stage as standard accessories or manufacturer options.

The electronic apparatus X17 is, for example, an electronic apparatus including a vehicle audio/visual (AV) device, car navigation system, and electronic toll collection (ETC) system, and can be mounted on vehicle X as a user option as desired.

The electronic apparatus X18 is, for example, an electronic apparatus including a vehicle-mounted blower, oil pump, water pump, battery cooling fan, and is equipped with a high-voltage system motor.

Moreover, the insulated switching power supply 1 can be assembled into any one of the electronic apparatuses X11 to X18.

Other Variation Examples

In addition to the embodiments, various modifications may be made to the technical features disclosed by the present disclosure without departing from the scope of the technical inventive subject thereof. That is to say, it should be understood that all aspects of the embodiments are exemplary rather than limiting, and it should also be understood that the technical scope of the present disclosure is not limited to the embodiments, but includes all modifications of equivalent meanings and within the same scope of the claims.

The invention claimed is:

1. A power supply control device, comprising:
   a feedback voltage generator, configured to generate a feedback voltage by sampling a primary voltage of a transformer that forms an insulated switching power supply;
   an on-timing setting unit, configured to turn on a primary current of the transformer based on a comparison result between the feedback voltage and a slope-shaped reference voltage; and
   an off-timing setting unit, configured to turn off the primary current after a predetermined on time has elapsed since the primary current was turned on, wherein a sampling timing of the primary voltage is set based on an on timing of the primary current, wherein:
   the on-timing setting unit is configured to generate a first feedback voltage and a second feedback voltage in response to receiving an input of the feedback voltage, the second feedback voltage being adjusted to intersect the slope-shaped reference voltage at a timing earlier than the first feedback voltage,
   the on timing of the primary current is determined by an intersection timing of the first feedback voltage and the slope-shaped reference voltage, and
   the sampling timing of the primary voltage is determined by an intersection timing of the second feedback voltage and the slope-shaped reference voltage.

2. The power supply control device of claim 1, wherein the on-timing setting unit includes:
   a buffer, configured to generate the first feedback voltage from the feedback voltage;
   a voltage divider, configured to divide the first feedback voltage to generate the second feedback voltage;
   an amplifier, configured to generate the reference voltage by blunting the pulse signal for turning on/off the primary current;
   a first comparator, configured to compare the first feedback voltage with the reference voltage to generate the first set signal for setting the on timing of the primary current; and
   a second comparator, configured to compare the second feedback voltage with the reference voltage to generate the second set signal for setting the sampling timing of the primary voltage.

3. The power supply control device of claim 1, wherein the on-timing setting unit includes a correction circuit operable to correct the on timing of the primary current such that a switching frequency of the insulated switching power supply keeps constant.

4. The power supply control device of claim 1, wherein the feedback voltage generator is configured to wait for sampling of the primary voltage until at least a predetermined mask time has elapsed after the primary current is turned off.

5. The power supply control device of claim 1, wherein the primary voltage is a switch voltage that appears in a primary winding of the transformer.

6. An insulated switching power supply, comprising:
   the power supply control device of claim 1;
   a transformer configured to apply a DC input voltage to a primary winding; and
   a rectifying and smoothing circuit configured to generate a DC output voltage by rectifying and smoothing an induced voltage generated in a secondary winding of the transformer.

7. A vehicle, comprising the insulated switching power supply of claim 6.

8. A power supply control device, comprising:
   a feedback voltage generator, configured to generate a feedback voltage by sampling a primary voltage of a transformer that forms an insulated switching power supply;
   an on-timing setting unit, configured to turn on a primary current of the transformer based on a comparison result between the feedback voltage and a slope-shaped reference voltage; and
   an off-timing setting unit, configured to turn off the primary current after a predetermined on time has elapsed since the primary current was turned on, wherein a sampling timing of the primary voltage is set based on an on timing of the primary current,
   wherein the on-timing setting unit includes a first reference voltage and a second reference voltage, the second reference voltage serving as the slope-shaped reference voltage and adjustable to have a slope shape synchronized with the first reference voltage and to intersect the feedback voltage at a timing earlier than the first reference voltage, and wherein
   the on timing of the primary current is determined by an intersection timing of the feedback voltage and the first reference voltage, and
   the sampling timing of the primary voltage is determined by an intersection timing of the feedback voltage and the second reference voltage.

9. The power supply control device of claim 8, wherein the on-timing setting unit includes:
   a first amplifier and a second amplifier, configured to blunt a pulse signal for turning on/off the primary current to respectively generate the first reference voltage and the second reference voltage;

a first comparator, configured to compare the feedback voltage with the first reference voltage to generate a first set signal for setting the on timing of the primary current; and a second comparator, configured to compare the feedback voltage with the second reference voltage to generate a second set signal for setting the sampling timing of the primary voltage.

10. The power supply control device of claim 9, wherein the on-timing setting unit includes a correction circuit operable to correct the on timing of the primary current such that a switching frequency of the insulated switching power supply keeps constant.

11. The power supply control device of claim 9, wherein the feedback voltage generator is configured to wait for sampling of the primary voltage until at least a predetermined mask time has elapsed after the primary current is turned off.

12. The power supply control device of claim 9, wherein the primary voltage is a switch voltage that appears in a primary winding of the transformer.

13. The power supply control device of claim 8, wherein the on-timing setting unit includes a correction circuit operable to correct the on timing of the primary current such that a switching frequency of the insulated switching power supply keeps constant.

14. The power supply control device of claim 8, wherein the feedback voltage generator is configured to wait for sampling of the primary voltage until at least a predetermined mask time has elapsed after the primary current is turned off.

15. The power supply control device of claim 8, wherein the primary voltage is a switch voltage that appears in a primary winding of the transformer.

16. An insulated switching power supply, comprising:
the power supply control device of claim 8;
a transformer configured to apply a DC input voltage to a primary winding; and
a rectifying and smoothing circuit configured to generate a DC output voltage by rectifying and smoothing an induced voltage generated in a secondary winding of the transformer.

\* \* \* \* \*